US006945149B2

(12) United States Patent
Gass et al.

(10) Patent No.: US 6,945,149 B2
(45) Date of Patent: Sep. 20, 2005

(54) ACTUATORS FOR USE IN FAST-ACTING SAFETY SYSTEMS

(75) Inventors: Stephen F. Gass, Wilsonville, OR (US); David A. Fanning, Vancouver, WA (US)

(73) Assignee: SD3, LLC, Wilsonville, OR (US)

( * ) Notice: Subject to any disclaimer, the term of this patent is extended or adjusted under 35 U.S.C. 154(b) by 250 days.

(21) Appl. No.: 10/205,164

(22) Filed: Jul. 25, 2002

(65) Prior Publication Data

US 2003/0020336 A1 Jan. 30, 2003

Related U.S. Application Data

(60) Provisional application No. 60/307,756, filed on Jul. 25, 2001.

(51) Int. Cl.[7] .............................. B26D 7/06; B27B 3/26; B23D 9/00

(52) U.S. Cl. ................... 83/62.1; 83/DIG. 1; 83/471.3; 83/477.1; 83/477.2; 83/488; 83/490; 83/581

(58) Field of Search ............................... 83/DIG. 1, 72, 83/62.1, 477.1, 477.2, 473, 488, 490, 581, 397, 397.1, 471.3; 30/370–371, 380–381, 388, 390, 392; 56/10.2 R, 12.4, 11.3; 125/13.01; 169/42; 318/362; 144/363, 365, 382, 420, 426, 427, 20, 117.1, 118, 123, 384, 391, 154.5, 209.1, 216, 251.1, 356; 188/1.11 R, 376, 1.11 E, 71.8, 82.7, 82.74, 82.77; 192/15, 17 C, 129 R, 133, 144, 130

(56) References Cited

U.S. PATENT DOCUMENTS

| | | |
|---|---|---|
| 146,886 A | 1/1874 | Doane et al. |
| 162,814 A | 5/1875 | Graves et al. |

(Continued)

FOREIGN PATENT DOCUMENTS

| | | |
|---|---|---|
| CH | 297525 | 6/1954 |
| DE | 76186 | 8/1921 |
| DE | 2800403 | 7/1979 |
| DE | 3427733 | 1/1986 |
| DE | 4235161 A1 | 5/1993 |
| DE | 4326313 | 2/1995 |
| DE | 19609771 | 6/1998 |
| EP | 146460 | 11/1988 |
| EP | 0362937 A2 | 4/1990 |
| ES | 2152184 | 1/2001 |
| FR | 2556643 | 6/1985 |
| FR | 2570017 | 3/1986 |
| GB | 598204 | 2/1948 |
| GB | 2096844 | 10/1982 |
| GB | 2142571 | 1/1985 |

OTHER PUBLICATIONS

U.S. Appl. No. 60/157,340, filed Oct. 1, 1999, entitled "Fast–Acting Safety Stop.".

U.S. Appl. No. 60/182,866, filed Feb. 16, 2000, entitled "Fast–Acting Safety Stop.".

IWF 2000 Challengers Award Official Entry Form, submitted Apr. 26, 2000, 6 pages plus CD (the portions of US patent applications referenced in the form are from U.S. Appl. No. 60/157,340, filed Oct. 1, 1999 and U.S. Appl. No. 60/182,866, filed Feb. 16, 2000).

Gordon Engineering Corp., Product Catalog, Oct. 1997, pp. cover, 1, 3 and back, Brookfield, Connecticut, US.

*You Should Have Invented It*, French television show video.

*Primary Examiner*—Boyer D. Ashley

(57) ABSTRACT

Cutting machines with high-speed safety systems, and actuators used in high-speed safety systems, are disclosed. The cutting machines may include a detection system adapted to detect a dangerous condition between a cutting tool and a person. A reaction system performs a specified action, such as stopping the cutting tool, upon detection of the dangerous condition. An actuator may be used to trigger the reaction system to perform the specified action.

16 Claims, 9 Drawing Sheets

U.S. PATENT DOCUMENTS

| | | | |
|---|---|---|---|
| 261,090 | A | 7/1882 | Grill |
| 264,412 | A | 9/1882 | Kuhlmann |
| 299,480 | A | 5/1884 | Kuhlmann et al. |
| 302,041 | A | 7/1884 | Sill |
| 307,112 | A | 10/1884 | Groff |
| 509,253 | A | 11/1893 | Shields |
| 545,504 | A | 9/1895 | Hoover |
| 869,513 | A | 10/1907 | Pfeil |
| 941,726 | A | 11/1909 | Pfalzgraf |
| 997,720 | A | 7/1911 | Troupenat |
| 1,037,843 | A | 9/1912 | Ackley |
| 1,050,649 | A | 1/1913 | Harrold et al. |
| 1,054,558 | A | 2/1913 | Jones |
| 1,074,198 | A | 9/1913 | Phillips |
| 1,082,870 | A | 12/1913 | Humason |
| 1,101,515 | A | 6/1914 | Adam |
| 1,126,970 | A | 2/1915 | Folmer |
| 1,132,129 | A | 3/1915 | Stevens |
| 1,148,169 | A | 7/1915 | Howe |
| 1,154,209 | A | 9/1915 | Rushton |
| 1,205,246 | A | 11/1916 | Mowry |
| 1,228,047 | A | 5/1917 | Reinhold |
| 1,240,430 | A | 9/1917 | Erickson |
| 1,244,187 | A | 10/1917 | Frisbie |
| 1,255,886 | A | 2/1918 | Jones |
| 1,258,961 | A | 3/1918 | Tattersall |
| 1,311,508 | A | 7/1919 | Harrold |
| 1,324,136 | A | 12/1919 | Turner |
| 1,381,612 | A | 6/1921 | Anderson |
| 1,397,606 | A | 11/1921 | Smith |
| 1,427,005 | A | 8/1922 | McMichael |
| 1,430,983 | A | 10/1922 | Granberg |
| 1,464,924 | A | 8/1923 | Drummond |
| 1,465,224 | A | 8/1923 | Lantz |
| 1,496,212 | A | 6/1924 | French |
| 1,511,797 | A | 10/1924 | Berghold |
| 1,526,128 | A | 2/1925 | Flohr |
| 1,527,587 | A | 2/1925 | Hutchinson |
| 1,551,900 | A | 9/1925 | Morrow |
| 1,553,996 | A | 9/1925 | Federer |
| 1,582,483 | A | 4/1926 | Runyan |
| 1,600,604 | A | 9/1926 | Sorlien |
| 1,616,478 | A | 2/1927 | Watson |
| 1,640,517 | A | 8/1927 | Procknow |
| 1,662,372 | A | 3/1928 | Ward |
| 1,701,948 | A | 2/1929 | Crowe |
| 1,711,490 | A | 5/1929 | Drummond |
| 1,712,828 | A | 5/1929 | Klehm |
| 1,774,521 | A | 9/1930 | Neighbour |
| 1,807,120 | A | 5/1931 | Lewis |
| 1,811,066 | A | 6/1931 | Tannewitz |
| 1,879,280 | A | 9/1932 | James |
| 1,896,924 | A | 2/1933 | Ulrich |
| 1,902,270 | A | 3/1933 | Tate |
| 1,904,005 | A | 4/1933 | Masset |
| 1,910,651 | A | 5/1933 | Tautz |
| 1,938,548 | A | 12/1933 | Tautz |
| 1,938,549 | A | 12/1933 | Tautz |
| 1,963,688 | A | 6/1934 | Tautz |
| 1,988,102 | A | 1/1935 | Woodward |
| 1,993,219 | A | 3/1935 | Merrigan |
| 2,007,887 | A | 7/1935 | Tautz |
| 2,010,851 | A | 8/1935 | Drummond |
| 2,020,222 | A | 11/1935 | Tautz |
| 2,038,810 | A | 4/1936 | Tautz |
| 2,075,282 | A | 3/1937 | Hedgpeth |
| 2,095,330 | A | 10/1937 | Hedgpeth |
| 2,106,288 | A | 1/1938 | Tautz |
| 2,106,321 | A | 1/1938 | Guertin |
| 2,121,069 | A | 6/1938 | Collins |
| 2,131,492 | A | 9/1938 | Ocenasek |
| 2,163,320 | A | 6/1939 | Hammond |
| 2,168,282 | A | 8/1939 | Tautz |
| 2,241,556 | A | 5/1941 | MacMillin et al. |
| 2,261,696 | A | 11/1941 | Ocenasek |
| 2,265,407 | A | 12/1941 | Tautz |
| 2,286,589 | A | 6/1942 | Tannewitz |
| 2,292,872 | A | 8/1942 | Eastman |
| 2,299,262 | A | 10/1942 | Uremovich |
| 2,312,118 | A | 2/1943 | Neisewander |
| 2,313,686 | A | 3/1943 | Uremovich |
| 2,328,244 | A | 8/1943 | Woodward |
| 2,352,235 | A | 6/1944 | Tautz |
| 2,377,265 | A | 3/1945 | Rady |
| 2,425,331 | A | 8/1947 | Kramer |
| 2,434,174 | A | 1/1948 | Morgan |
| 2,466,325 | A | 4/1949 | Ocenasek |
| 2,496,613 | A | 2/1950 | Woodward |
| 2,509,813 | A | 5/1950 | Dineen |
| 2,517,649 | A | 8/1950 | Frechtmann |
| 2,518,684 | A | 8/1950 | Harris |
| 2,530,290 | A | 11/1950 | Collins |
| 2,554,124 | A | 5/1951 | Salmont |
| 2,572,326 | A | 10/1951 | Evans |
| 2,590,035 | A | 3/1952 | Pollak |
| 2,593,596 | A | 4/1952 | Olson |
| 2,623,555 | A | 12/1952 | Eschenburg |
| 2,625,966 | A | 1/1953 | Copp |
| 2,626,639 | A | 1/1953 | Hess |
| 2,661,777 | A | 12/1953 | Hitchcock |
| 2,661,780 | A | 12/1953 | Morgan |
| 2,675,707 | A | 4/1954 | Brown |
| 2,678,071 | A | 5/1954 | Odlum et al. |
| 2,690,084 | A | 9/1954 | Van Dam |
| 2,695,638 | A | 11/1954 | Gaskell |
| 2,704,560 | A | 3/1955 | Woessner |
| 2,711,762 | A | 6/1955 | Gaskell |
| 2,722,246 | A | 11/1955 | Arnoldy |
| 2,731,049 | A | 1/1956 | Akin |
| 2,736,348 | A | 2/1956 | Nelson |
| 2,758,615 | A | 8/1956 | Mastriforte |
| 2,785,710 | A | 3/1957 | Mowery, Jr. |
| 2,786,496 | A | 3/1957 | Eschenberg |
| 2,810,408 | A | 10/1957 | Boice et al. |
| 2,844,173 | A | 7/1958 | Gaskell |
| 2,850,054 | A | 9/1958 | Eschenburg |
| 2,852,047 | A | 9/1958 | Odlum et al. |
| 2,873,773 | A | 2/1959 | Gaskell |
| 2,894,546 | A | 7/1959 | Eschenburg |
| 2,913,025 | A | 11/1959 | Richards |
| 2,945,516 | A | 7/1960 | Edgemond, Jr. et al. |
| 2,954,118 | A | 9/1960 | Anderson |
| 2,978,084 | A | 4/1961 | Vilkaitis |
| 2,984,268 | A | 5/1961 | Vuichard |
| 3,005,477 | A | 10/1961 | Sherwen |
| 3,011,529 | A | 12/1961 | Copp |
| 3,011,610 | A | 12/1961 | Stiebel et al. |
| 3,013,592 | A | 12/1961 | Ambrosio et al. |
| 3,021,881 | A | 2/1962 | Edgemond, Jr. et al. |
| 3,047,116 | A | 7/1962 | Stiebel et al. |
| 3,085,602 | A | 4/1963 | Gaskell |
| 3,105,530 | A | 10/1963 | Peterson |
| 3,129,731 | A | 4/1964 | Tyrrell |
| 3,163,732 | A | 12/1964 | Abbott |
| 3,184,001 | A | 5/1965 | Reinsch et al. |
| 3,186,256 | A | 6/1965 | Reznick |
| 3,207,273 | A | 9/1965 | Jurin |
| 3,224,474 | A | 12/1965 | Bloom |
| 3,232,326 | A | 2/1966 | Speer et al. |
| 3,249,134 | A | 5/1966 | Vogl et al. |
| 3,306,149 | A | 2/1967 | John |

3,315,715 A 4/1967 Mytinger
3,323,814 A 6/1967 Phillips
3,356,111 A 12/1967 Mitchell
3,386,322 A 6/1968 Stone et al.
3,454,286 A 7/1969 Anderson et al.
3,538,964 A 11/1970 Warrick et al.
3,540,338 A 11/1970 McEwan et al.
3,554,067 A 1/1971 Scutella
3,580,609 A 5/1971 Menge
3,581,784 A 6/1971 Warrick
3,613,748 A 10/1971 De Pue
3,670,788 A 6/1972 Pollak et al.
3,675,444 A 7/1972 Whipple
3,680,609 A 8/1972 Menge
3,695,116 A 10/1972 Baur
3,696,844 A 10/1972 Bernatschek
3,745,546 A 7/1973 Struger et al.
3,749,933 A 7/1973 Davidson
3,754,493 A 8/1973 Niehaus et al.
3,772,590 A 11/1973 Mikulecky et al.
3,785,230 A 1/1974 Lokey
3,805,639 A 4/1974 Peter
3,805,658 A 4/1974 Scott et al.
3,808,932 A 5/1974 Russell
3,829,850 A 8/1974 Guetersloh
3,858,095 A 12/1974 Friemann et al.
3,861,016 A 1/1975 Johnson et al.
3,880,032 A 4/1975 Green
3,889,567 A 6/1975 Sato et al.
3,922,785 A 12/1975 Fushiya
3,924,688 A 12/1975 Cooper et al.
3,931,727 A 1/1976 Luenser
3,946,631 A 3/1976 Malm
3,947,734 A 3/1976 Fyler
3,949,636 A 4/1976 Ball et al.
3,953,770 A 4/1976 Hayashi
3,967,161 A 6/1976 Lichtblau
3,994,192 A 11/1976 Faig
4,007,679 A 2/1977 Edwards
4,026,174 A 5/1977 Fierro
4,026,177 A 5/1977 Lokey
4,047,156 A 9/1977 Atkins
4,048,886 A 9/1977 Zettler
4,060,160 A 11/1977 Lieber
4,070,940 A 1/1978 McDaniel et al.
4,075,961 A 2/1978 Harris
4,077,161 A 3/1978 Wyle et al.
4,085,303 A 4/1978 McIntyre et al.
4,090,345 A 5/1978 Harkness
4,091,698 A 5/1978 Obear et al.
4,117,752 A 10/1978 Yoneda
4,145,940 A 3/1979 Woloveke et al.
4,152,833 A 5/1979 Phillips
4,161,649 A 7/1979 Klos et al.
4,175,452 A 11/1979 Idel
4,190,000 A 2/1980 Shaull et al.
4,195,722 A 4/1980 Anderson et al.
4,199,930 A 4/1980 Lebet et al.
4,249,117 A 2/1981 Leukhardt et al.
4,249,442 A 2/1981 Fittery
4,267,914 A 5/1981 Saar
4,270,427 A 6/1981 Colberg et al.
4,276,799 A 7/1981 Muehling
4,291,794 A 9/1981 Bauer
4,305,442 A 12/1981 Currie
4,321,841 A 3/1982 Felix
4,372,202 A 2/1983 Cameron
4,391,358 A 7/1983 Haeger
4,418,597 A 12/1983 Krusemark et al.
4,466,233 A 8/1984 Thesman
4,470,046 A 9/1984 Betsill
4,510,489 A 4/1985 Anderson, III et al.
4,512,224 A 4/1985 Terauchi
4,518,043 A 5/1985 Anderson et al.
4,532,501 A 7/1985 Hoffman
4,532,844 A 8/1985 Chang et al.
4,557,168 A 12/1985 Tokiwa
4,560,033 A 12/1985 DeWoody et al.
4,566,512 A 1/1986 Wilson
4,573,556 A 3/1986 Andreasson
4,576,073 A 3/1986 Stinson
4,589,047 A 5/1986 Gaus et al.
4,589,860 A 5/1986 Brandenstein et al.
4,599,597 A 7/1986 Rotbart
4,599,927 A 7/1986 Eccardt et al.
4,606,251 A 8/1986 Boileau
4,615,247 A 10/1986 Berkeley
4,621,300 A 11/1986 Summerer
4,625,604 A 12/1986 Handler et al.
4,637,188 A 1/1987 Crothers
4,637,289 A 1/1987 Ramsden
4,644,832 A 2/1987 Smith
4,653,189 A 3/1987 Andreasson
4,657,428 A 4/1987 Wiley
4,679,719 A 7/1987 Kramer
4,722,021 A 1/1988 Hornung et al.
4,751,603 A 6/1988 Kwan
4,756,220 A 7/1988 Olsen et al.
4,757,881 A 7/1988 Jonsson et al.
4,792,965 A 12/1988 Morgan
4,805,504 A 2/1989 Fushiya et al.
4,840,135 A 6/1989 Yamauchi
4,864,455 A 9/1989 Shimomura et al.
4,875,398 A 10/1989 Taylor et al.
4,906,962 A 3/1990 Duimstra
4,934,233 A 6/1990 Brundage et al.
4,937,554 A 6/1990 Herman
4,965,909 A 10/1990 McCullough et al.
5,020,406 A 6/1991 Sasaki et al.
5,025,175 A 6/1991 Dubois, III
5,046,426 A 9/1991 Julien et al.
5,052,255 A 10/1991 Gaines
5,074,047 A 12/1991 King
5,081,406 A 1/1992 Hughes et al.
5,082,316 A 1/1992 Wardlaw
5,083,973 A 1/1992 Townsend
5,086,890 A 2/1992 Turczyn et al.
5,119,555 A 6/1992 Johnson
5,122,091 A 6/1992 Townsend
5,174,349 A 12/1992 Svetlik et al.
5,184,534 A 2/1993 Lee
5,198,702 A 3/1993 McCullough et al.
5,199,343 A 4/1993 OBanion
5,201,684 A 4/1993 DeBois, III
5,207,253 A 5/1993 Hoshino et al.
5,212,621 A 5/1993 Panter
5,218,189 A 6/1993 Hutchison
5,231,359 A 7/1993 Masuda et al.
5,231,906 A 8/1993 Kogej
5,239,978 A 8/1993 Plangetis
5,245,879 A 9/1993 McKeon
5,257,570 A 11/1993 Shiotani et al.
5,265,510 A 11/1993 Hoyer-Ellefsen
5,272,946 A 12/1993 McCullough et al.
5,276,431 A 1/1994 Piccoli et al.
5,285,708 A 2/1994 Bosten et al.
5,320,382 A 6/1994 Goldstein et al.
5,321,230 A 6/1994 Shanklin et al.
5,331,875 A 7/1994 Mayfield
5,377,554 A 1/1995 Reulein et al.
5,377,571 A 1/1995 Josephs
5,392,678 A 2/1995 Sasaki et al.

| | | | |
|---|---|---|---|
| 5,411,221 | A | 5/1995 | Collins et al. |
| 5,471,888 | A | 12/1995 | McCormick |
| 5,510,685 | A | 4/1996 | Grasselli |
| 5,513,548 | A | 5/1996 | Garuglieri |
| 5,534,836 | A | 7/1996 | Schenkel et al. |
| 5,572,916 | A | 11/1996 | Takano |
| 5,587,618 | A | 12/1996 | Hathaway |
| 5,606,889 | A | 3/1997 | Bielinski et al. |
| 5,667,152 | A | 9/1997 | Mooring |
| 5,671,633 | A | 9/1997 | Wagner |
| 5,695,306 | A | 12/1997 | Nygren, Jr. |
| 5,724,875 | A | 3/1998 | Meredith et al. |
| 5,730,165 | A | 3/1998 | Philipp |
| 5,755,148 | A | 5/1998 | Stumpf et al. |
| 5,771,742 | A | 6/1998 | Bokaie et al. |
| 5,782,001 | A | 7/1998 | Gray |
| 5,787,779 | A | 8/1998 | Garuglieri |
| 5,791,057 | A | 8/1998 | Nakamura et al. |
| 5,791,223 | A | 8/1998 | Lanzer |
| 5,791,224 | A | 8/1998 | Suzuki et al. |
| 5,852,951 | A | 12/1998 | Santi |
| 5,861,809 | A | 1/1999 | Eckstein et al. |
| 5,875,698 | A | 3/1999 | Ceroll et al. |
| 5,921,367 | A | 7/1999 | Kashioka et al. |
| 5,937,720 | A | 8/1999 | Itzov |
| 5,942,975 | A | 8/1999 | Sorensen |
| 5,943,932 | A | 8/1999 | Sberveglieri |
| 5,950,514 | A | 9/1999 | Benedict et al. |
| 5,963,173 | A | 10/1999 | Lian et al. |
| 5,974,927 | A | 11/1999 | Tsune |
| 5,989,116 | A | 11/1999 | Johnson et al. |
| 6,018,284 | A | 1/2000 | Rival et al. |
| 6,037,729 | A | 3/2000 | Woods et al. |
| 6,052,884 | A | 4/2000 | Steckler et al. |
| 6,095,092 | A | 8/2000 | Chou |
| 6,119,984 | A | 9/2000 | Devine |
| 6,133,818 | A | 10/2000 | Hsieh et al. |
| 6,148,504 | A | 11/2000 | Schmidt et al. |
| 6,150,826 | A | 11/2000 | Hokodate et al. |
| 6,170,370 | B1 | 1/2001 | Sommerville |
| 6,244,149 | B1 | 6/2001 | Ceroll et al. |
| 6,257,061 | B1 | 7/2001 | Nonoyama et al. |
| 6,366,099 | B1 | 4/2002 | Reddi |
| 6,376,939 | B1 | 4/2002 | Suzuki et al. |
| 6,404,098 | B1 | 6/2002 | Kayama et al. |
| 6,405,624 | B2 | 6/2002 | Sutton |
| 6,418,829 | B1 | 7/2002 | Pilchowski |
| 6,420,814 | B1 | 7/2002 | Bobbio |
| 6,430,007 | B1 | 8/2002 | Jabbari |
| 6,431,425 | B1 | 8/2002 | Moorman et al. |
| 6,450,077 | B1 | 9/2002 | Ceroll et al. |
| 6,453,786 | B1 | 9/2002 | Ceroll et al. |
| 6,460,442 | B2 | 10/2002 | Talesky et al. |
| 6,471,106 | B1 | 10/2002 | Reining |
| 6,479,958 | B1 | 11/2002 | Thompson et al. |
| D466,913 | S | 12/2002 | Ceroll et al. |
| 6,492,802 | B1 | 12/2002 | Bielski |
| D469,354 | S | 1/2003 | Curtsinger |
| 6,502,493 | B1 | 1/2003 | Eccardt et al. |
| 6,536,536 | B1 | 3/2003 | Gass et al. |
| 6,543,324 | B2 | 4/2003 | Dils |
| 6,546,835 | B2 | 4/2003 | Wang |
| 6,575,067 | B2 | 6/2003 | Parks et al. |
| 6,578,460 | B2 | 6/2003 | Sartori |
| 6,578,856 | B2 | 6/2003 | Kahle |
| 6,595,096 | B2 | 7/2003 | Ceroll et al. |
| D478,917 | S | 8/2003 | Ceroll et al. |
| 6,601,493 | B1 | 8/2003 | Crofutt |
| 6,607,015 | B1 | 8/2003 | Chen |
| D479,538 | S | 9/2003 | Welsh et al. |
| 6,617,720 | B1 | 9/2003 | Egan, III et al. |
| 6,619,348 | B2 | 9/2003 | Wang |
| 6,640,683 | B2 | 11/2003 | Lee |
| 6,644,157 | B2 | 11/2003 | Huang |
| 6,647,847 | B2 | 11/2003 | Hewitt et al. |
| 6,736,042 | B2 | 5/2004 | Behne et al. |
| 6,826,988 | B2 | 12/2004 | Gass et al. |
| 6,857,345 | B2 | 2/2005 | Gass et al. |
| 2001/0032534 | A1 | 10/2001 | Cerroll et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0020271 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0096030 | A1 | 7/2002 | Wang |
| 2002/0109036 | A1 | 8/2002 | Denen et al. |
| 2002/0170399 | A1 | 11/2002 | Gass et al. |
| 2002/0170400 | A1 | 11/2002 | Gass |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0020336 | A1 | 1/2003 | Gass et al. |
| 2003/0037651 | A1 | 2/2003 | Gass et al. |
| 2003/0056853 | A1 | 3/2003 | Gass et al. |
| 2003/0074873 | A1 | 4/2003 | Freiberg et al. |
| 2003/0089212 | A1 | 5/2003 | Parks et al. |
| 2003/0101857 | A1 | 6/2003 | Chuang |
| 2003/0109798 | A1 | 6/2003 | Kermani |
| 2004/0226424 | A1 | 11/2004 | OBanion et al. |

ACTUATORS FOR USE IN FAST-ACTING SAFETY SYSTEMS

CROSS-REFERENCE TO RELATED APPLICATIONS

This application claims the benefit of and priority from the following U.S. Provisional Patent Application, the disclosure of which is herein incorporated by reference: Ser. No. 60/307,756, filed Jul. 25, 2001.

FIELD

The invention relates to safety systems and more particularly to actuators for use in high-speed safety systems for power equipment.

BACKGROUND

Safety systems are often employed with power equipment such as table saws, miter saws and other woodworking machinery, to minimize the risk of injury when using the equipment. Probably the most common safety feature is a guard that physically blocks an operator from making contact with dangerous components of machinery, such as belts, shafts or blades. In many cases, guards effectively reduce the risk of injury, however, there are many instances where the nature of the operations to be performed precludes using a guard that completely blocks access to hazardous machine parts.

Other safety systems try to prevent or minimize injury by detecting and reacting to an event. For instance, U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine. U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid and the way the solenoid is used.

U.S. Pat. No. 4,117,752, which is herein incorporated by reference, discloses a braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 milliseconds to 1 second to stop the blade. Therefore, the system is too slow to stop the blade quickly enough to avoid serious injury.

None of these existing systems have operated with sufficient speed and/or reliability to prevent serious injury with many types of commonly used power tools.

DETAILED DESCRIPTION

Figure 1:
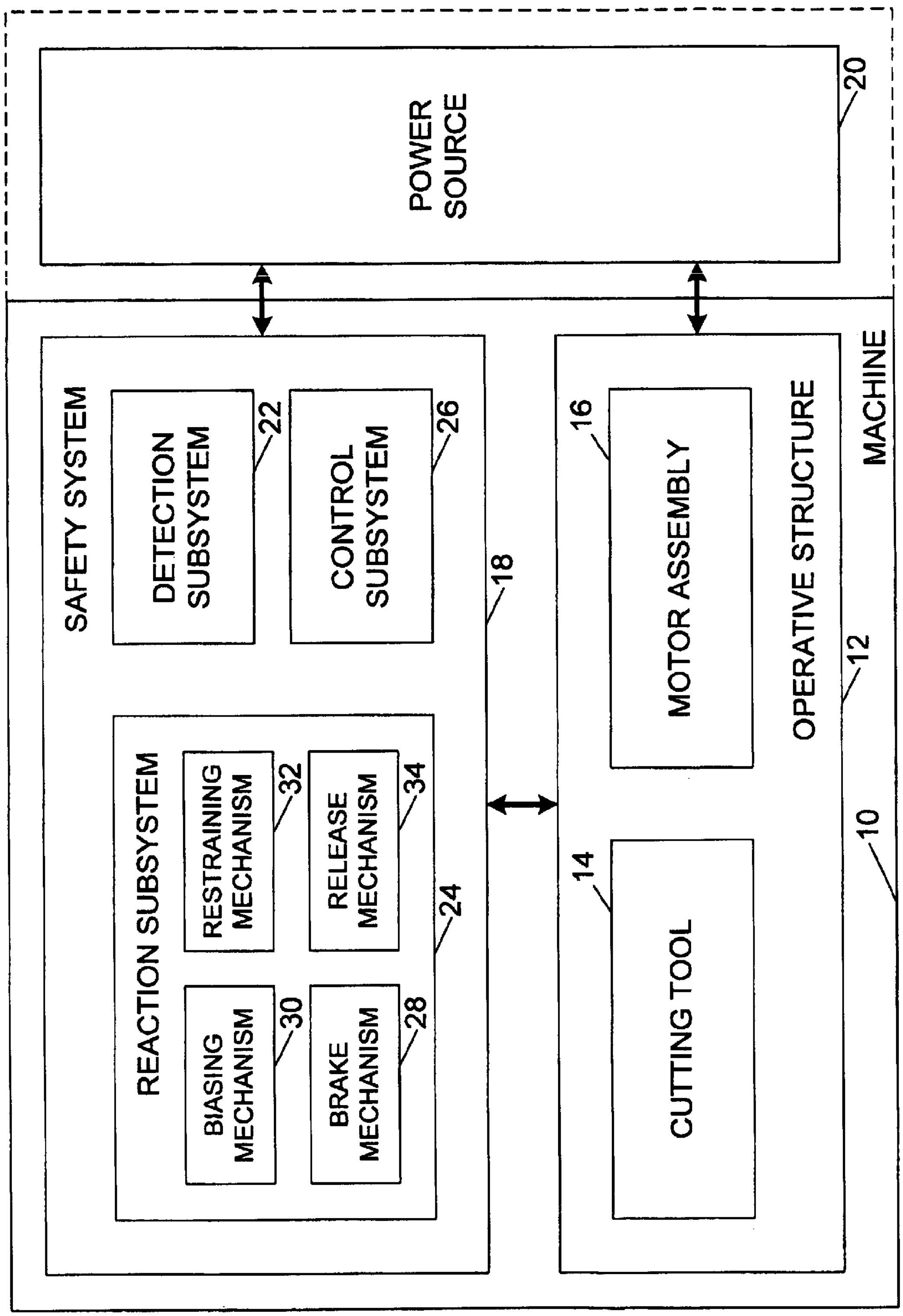
FIG. 1 is a schematic block diagram of a machine with a fast-acting safety system.

A machine that may incorporate a firing subsystem according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, up-cut saw, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, entitled "Fast-Acting Safety Stop," filed Feb. 16, 2000 by SD3, LLC, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and a person is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," also filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
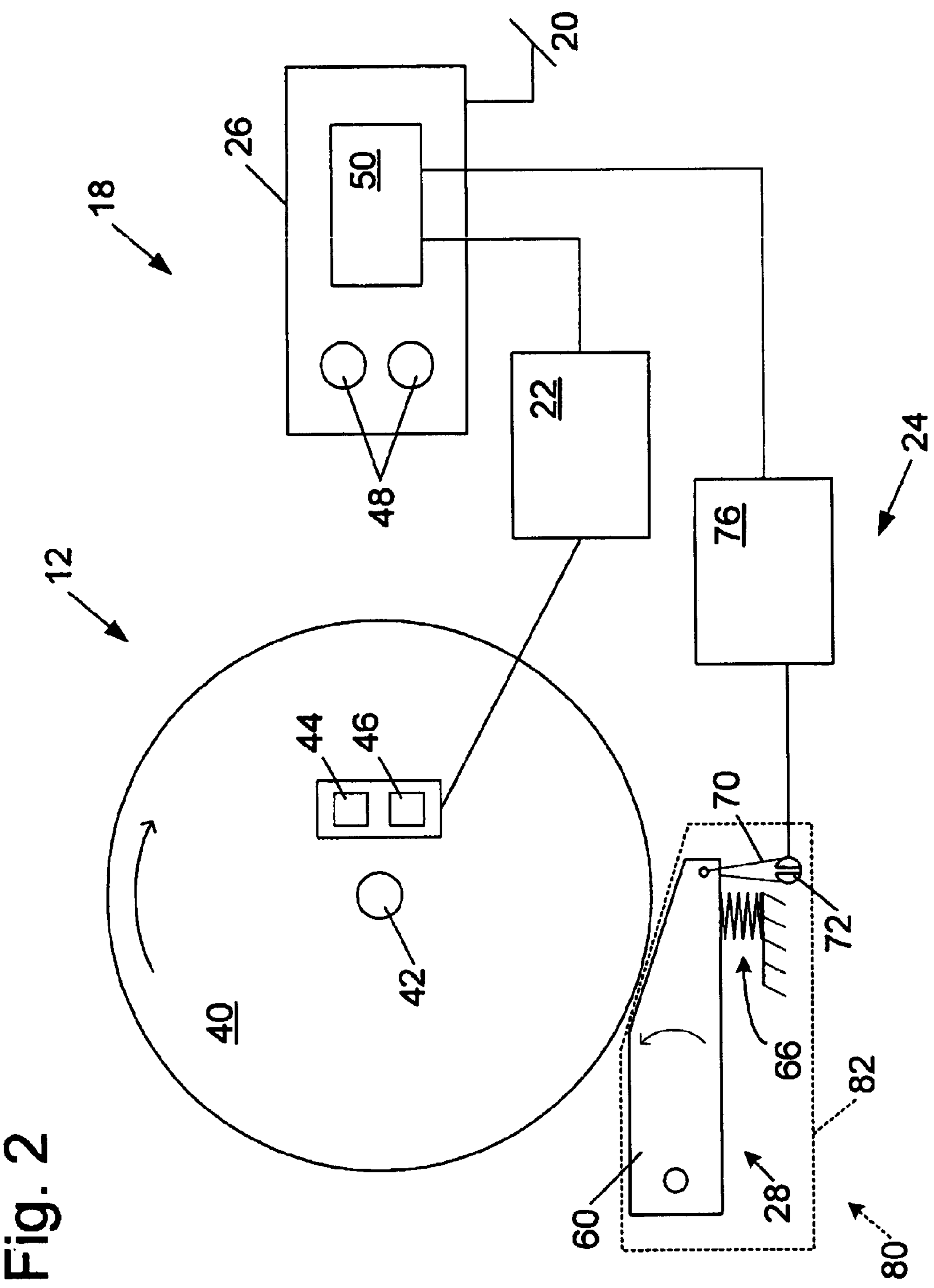
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of control subsystem 26 are described in more detail in U.S. Provisional Patent Application Ser. No. 60/225,059, entitled "Logic Control For Fast Acting Safety System," filed Aug. 14, 2000 by SD3, LLC, and U.S. Provisional Patent Application Ser. No. 60/225,094, entitled "Motion Detecting System For Use In Safety System For Power Equipment," filed Aug. 14, 2000 by SD3, LLC, the disclosures of which are herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 might also be used. The spring is adapted to urge pawl 60 into the teeth of the blade with sufficient force to grip the blade and quickly bring it to a stop.

A restraining mechanism 70 holds the pawl away from the edge of the blade. The restraining member may take different forms. For example, in some embodiments the restraining member is a fusible member. The fusible member is constructed of a suitable material and adapted to restrain the pawl against the bias of spring 66, and also adapted to melt under a determined electrical current density to release the pawl. Various exemplary embodiments and implementations of restraining members and fusible members are described in more detail in U.S. Provisional Patent Application Ser. No. 60/225,056, entitled "Firing Subsystem for use in a Fast-Acting Safety System," filed Aug. 14, 2000 by SD3, LLC, the disclosure of which is herein incorporated by reference. In other embodiments, the restraining member may include various mechanical linkages, or may be part of various actuators, and those linkages and/or actuators may be released or fired by solenoids, gas cylinders, electromagnets, and/or explosives. Preferably, restraining member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately 1/32-inch to 1/4-inch from the edge of the blade by restraining member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is configured to release the restraining member 70 so that the pawl can move into the blade. For example, firing subsystem 76 may melt a fusible member by passing a surge of electrical current through the fusible member, or the firing subsystem may trigger a solenoid, gas cylinder, electromagnet or explosive to release or move the pawl. Firing subsystem 76 is coupled to logic controller 50 and activated by a signal from the logic controller. When the logic controller receives a contact detection signal from detection subsystem 22, the logic controller sends an activation signal to firing subsystem 76, thereby releasing the pawl to stop the blade. Various exemplary embodiments and implementations of reaction subsystem 24 are described in more detail in U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and restraining member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, restraining member 70 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. No. 60/157,340, entitled "Fast-Acting Safety Stop," filed Oct. 1, 1999, and Ser. No. 60/182,866, also entitled "Fast-Acting Safety Stop," filed Feb. 16, 2000, the disclosures of which are herein incorporated by reference.

As explained above, in some embodiments of safety system 18, a restraining member 70 is used to restrain some element or action, such as to hold a brake or pawl away from a blade. Such a restraining member may take different forms. For example, it may be an actuator or part of an actuator that applies a force to move a brake pawl into a blade. One possible embodiment of such an actuator is shown at 99 in FIGS. 3 and 4.

The depicted embodiment includes a solenoid 100 mounted in a housing 102. Solenoid 100 includes a wire helically coiled around a tube or cylinder. A metal core or plunger, often taking the form of a rod, is positioned adjacent the cylinder at least partially within the coiled wire. The solenoid creates a magnetic field when electric current flows through the coiled wire, and the magnetic field then causes the plunger to move, typically drawing the plunger into the cylinder. The plunger is often spring-biased out from the cylinder so that it extends from the cylinder when there is no current flowing through the coil, and then is drawn in when current is flowing through the coil. Thus, solenoids are used to move a plunger in and out depending on whether electricity flows through the coil. The in-and-out movement of the plunger can be used to trigger or cause some action to take place. The solenoid may be powered by firing circuit 76.

Solenoid 100 may be any one of various solenoids. For example, it may be TO-5 solenoid from Line Electric Company of South Glastonbury, Conn. Those solenoids may apply forces of 1 to 50 grams with response times of around 0.5 milliseconds, depending on the power supplied to the coil, the distance the plunger moves, and other variables. Of course, TO-5 solenoids are identified only as examples, and other solenoids may be used.

Figure 3:
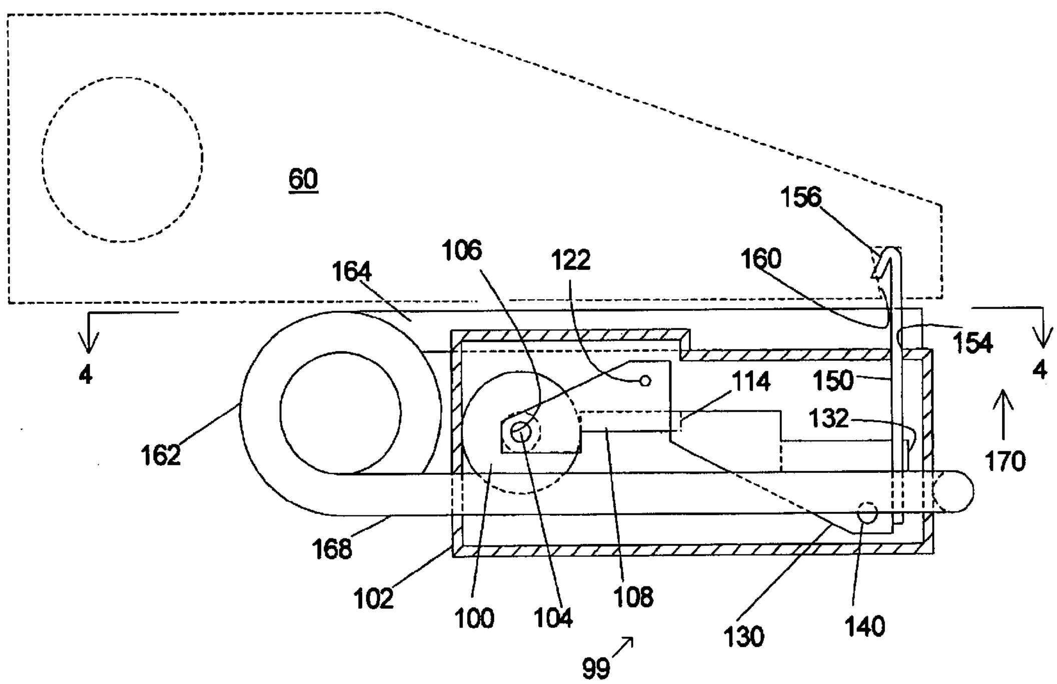
FIG. 3 shows a possible actuator for use in a safety system.
Figure 4:
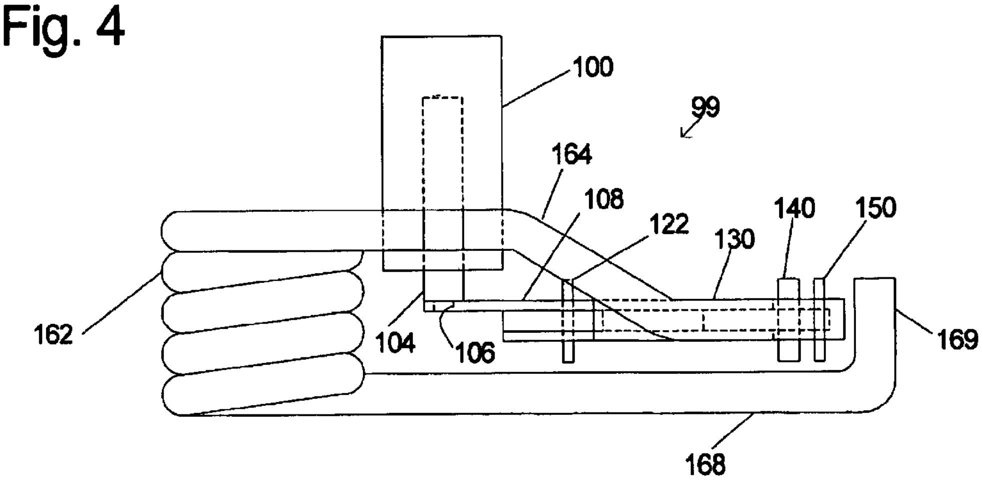
FIG. 4 shows a simplified view of the actuator shown in FIG. 3 from a different perspective.

In the embodiment shown in FIGS. 3 and 4, a plunger 104 extends outwardly from solenoid 100. A spring or some other biasing means biases plunger 104 outwardly from the solenoid, and the plunger is drawn into the solenoid when current flows through the solenoid. The embodiment shown in FIGS. 3 and 4 uses the movement of plunger 104 to release brake pawl 60 to stop the blade of a saw, as described above.

Figure 5:
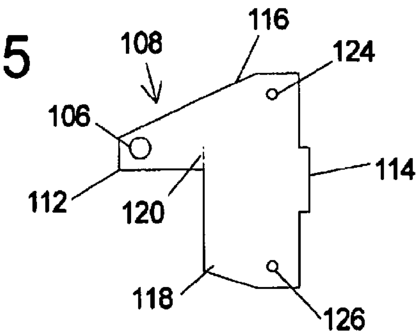
FIG. 5 shows a plate used to construct a pivot arm used in the actuator of FIG. 3.
Figure 6:
FIG. 6 shows how the plate of FIG. 5 is folded to construct the pivot arm.

The end of plunger 104 that extends outwardly from solenoid 100 passes into an aperture 106 in a first pivot arm 108. First pivot arm 108 may take many different forms. In FIGS. 3 and 4, first pivot arm 108 is made from a flat piece of metal, as shown in FIG. 5, and it includes ends 112 and 114, and first and second wing portions 116 and 118. A cut 120 is made between the wing portions and end 116. The wings and end 118 are then folded together into something like a "W" shape when viewed from end 118, as shown in FIG. 6. Cut 120 allows for the center section to be folded into the "W" shape. When folded, the wings provide rigidity and ends 116 and 118 extend outwardly, as shown in FIG. 3. A pivot pin 122 is supported by housing 102, and first pivot arm 108 is mounted to pivot around pivot pin 122. Pivot pin 122 extends through apertures 124 and 126 in wings 112 and 114. However, plunger 104 extends into aperture 106 in first pivot arm 108 and thereby prevents the first pivot arm from pivoting.

Figure 8:
FIG. 8 shows how the plate of FIG. 7 is folded.
Figure 7:
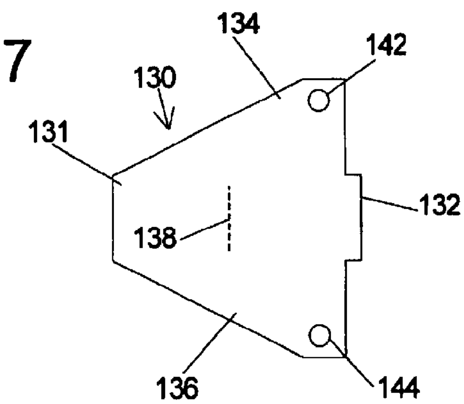
FIG. 7 shows a plate used to construct another pivot arm used in the actuator of FIG. 3.

Actuator 99 also includes a second pivot arm 130. Second pivot arm 130, like the first pivot arm, may take many different forms. The form shown in FIGS. 3 and 4 is similar to the shape of the first pivot arm, and is also made from a flat piece of metal, as shown in FIG. 7. The flat piece of metal includes ends 131 and 132, and wings 134 and 136. A cut 138 is made in the metal, so that the wings and end 132 can be folded into a "W" shape when viewed from end 132, as shown in FIG. 8. A second pivot pin 140 is supported by housing 102, and second pivot arm 130 is mounted to pivot around pivot pin 140. Pivot pin 140 extends through apertures 142 and 144 in wings 134 and 136. However, end 118 of first pivot arm 108 extends over and against end 131 of the second pivot arm to prevent the second pivot arm from pivoting.

Figure 9:
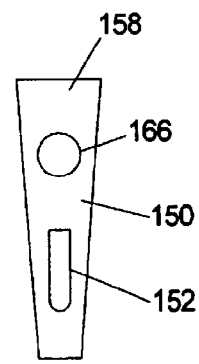
FIG. 9 shows a restraining plate used in the actuator of FIG. 3.

Second pivot arm 130, in turn, holds a plate 150 in place. Plate 150 is shown in FIGS. 3, 4 and 9. End 132 of second pivot arm 130 extends through an aperture 152 in plate 150 to hold the plate in place. Plate 150 extends out of housing 102 through a slot 154 in the housing, and a barb 156 on end 158 of the plate engages a slot 160 in brake pawl 60. In this manner, plate 150 holds brake pawl 60 in place. Of course, the plate may engage with the brake pawl in many different ways, such as by a hook, a simple friction fit, an abutment, etc., and barb 156 is only one example. Brake pawl 60 also may be positioned relative to actuator 99 in different ways. For example, the brake pawl may be oriented so that it extends approximately perpendicularly from the actuator (or out of or into the page when looking at FIG. 3).

Actuator 99 also includes a torsion spring 162, having a first arm 164 that extends through an aperture 166 in plate 150. Spring 162 also includes a second arm 168 that extends adjacent housing 102. Second arm 168 may pass through apertures in the housing to mount the spring to the housing, or the arm may be attached to the housing in some other way, such as with screws or mounting clips. When spring 162 is compressed, the spring force causes arms 164 and 168 to want to spread apart. Thus, when second arm 168 is attached to housing 102, and the housing is mounted in a saw, the spring wants to move first arm 164 in the direction of arrow 170. That spring arm 164, in turn, pushes plate 150 and brake pawl 60 in the direction of arrow 170, which would be toward the blade of a saw, as explained above. However, plate 150 is prevented from moving by second pivot arm 130, which is held in place by first pivot arm 108, which is held in place by plunger 104 in solenoid 100, as explained. Thus, spring 162 holds the parts of actuator 99 in tension. That tension helps hold plate 150 in place. Spring 162 is often a strong spring, capable of applying 100 pounds or more of force, so the tension on the components of actuator 99 is significant. That tension makes the actuator and components substantially stable and able to withstand the normal vibrations and jostling of a saw. Second arm 168 of spring 162 includes a bend 169 at its end to provide stability for the spring and to counter any twisting or torque of the spring when the spring is compressed.

Figure 10:
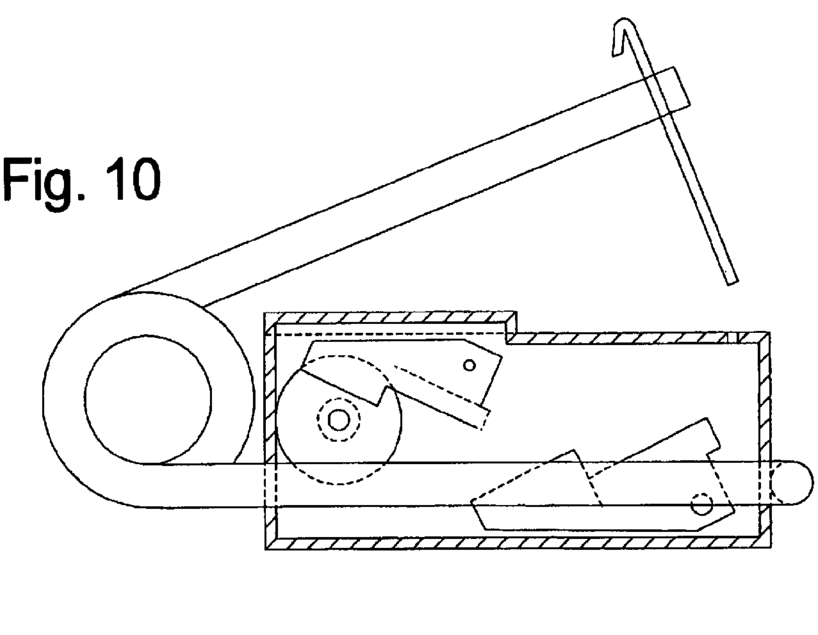
FIG. 10 shows the actuator of FIG. 3 in a fired or actuated state.

When electric current is applied to solenoid 100, plunger 104 is retracted, allowing the first pivot arm to pivot around pin 122. When the first pivot arm is released, the second pivot arm and plate are also released and free to move. Spring 162 then forces plate 150 to move in the direction of arrow 170, and the first and second pivot arms pivot as shown in FIG. 10. Aperture 152 in plate 150 is sized and shaped to allow end 132 of the second pivot arm to move out of the aperture as the plate is pulled in the direction of arrow 170. Housing 102 is sized to provide the space necessary for the pivot arms to pivot sufficiently to release plate 150.

Thus, actuator 99 provides a mechanism that releases a force by using a solenoid. The force is then used to move a brake pawl into the teeth of a spinning saw blade, as explained above. Solenoid 100 must be sufficiently strong to overcome the friction between plunger 104 and aperture 106 caused by spring 162 putting tension on the parts of the actuator. Otherwise, the solenoid could not retract plunger 104. Often, as stated, a very strong spring is used to push the brake pawl into the saw blade as quickly as possible. However, the stronger the spring, the more tension on the system and the more friction between the plunger and the aperture. Actuator 99 accommodates strong springs by using multiple pivot arms. For example, the two pivot arms described above provide the mechanical advantage necessary to hold a strong spring. Two or more pivot arms are used to gain the advantage of multiple pivot points, rather than using a single pivot point with a longer moment arm. However, a single pivot arm may be used in some embodiments. In the embodiment shown in FIGS. 3 and 4, a solenoid that can retract a plunger with a force of approximately 50 grams can hold a spring force of around 100 Newtons, considering that first pivot arm 108 provides a mechanical advantage of a factor of 3 to 4, and second pivot arm 130 provides a mechanical advantage of a factor of around 6, and the solenoid would need to provide a retraction force to overcome the friction on the plunger of approximately $1/10^{th}$ of the force on the plunger from the spring. Of course, the pivot arms can be sized differently to provide the mechanical advantage necessary for different springs, or different numbers of pivot arms can be used. One significant advantage of using a mechanical linkage like the two pivot arms discussed above, is that actuator 99 may use a solenoid that is physically small and relatively inexpensive to release the spring, resulting in an actuator that is effective, economical, and sized so that it is applicable to various types of saws.

Another significant benefit of the actuator shown in FIGS. 3 and 4 is that it completely releases a significant force with only a short, discrete movement of plunger 104. The plunger need only retract a specified and determined amount to disengage with first pivot arm 108, and the entire force of spring 162 is released. Thus, the speed at which the actuator can apply a force is maximized because time is not spent by the solenoid moving the plunger a significant distance. That results in being able to stop the blade of the saw quicker that otherwise would be possible, and stopping the blade as quickly as possible minimizes any injury to a person accidentally contacting the blade.

The solenoid also must be sufficiently strong to overcome the spring or other means that biases plunger 104 outwardly. The solenoid also must release the force quickly enough so that the brake can engage and stop the saw blade before a person who accidentally contacts the blade receives a serious injury under typical circumstances. The necessary release time will depend on the embodiment, but will usually not exceed around 5 milliseconds. Of course, the shorter the release time the better.

Housing 102 for actuator 99 is shaped to accommodate the solenoid, pivot arms and restraining plate. The housing typically would be sealed against the entry of sawdust, with the only opening being slot 154 through which plate 150 passes. The housing is compact, and is designed to work as a "drop-in" component or cartridge. For example, a saw can be constructed to accommodate a brake pawl and actuator, and then after the actuator has fired and the brake pawl has moved into the blade, the spent actuator and brake pawl can be removed and a new actuator and brake pawl dropped in.

Figure 11:
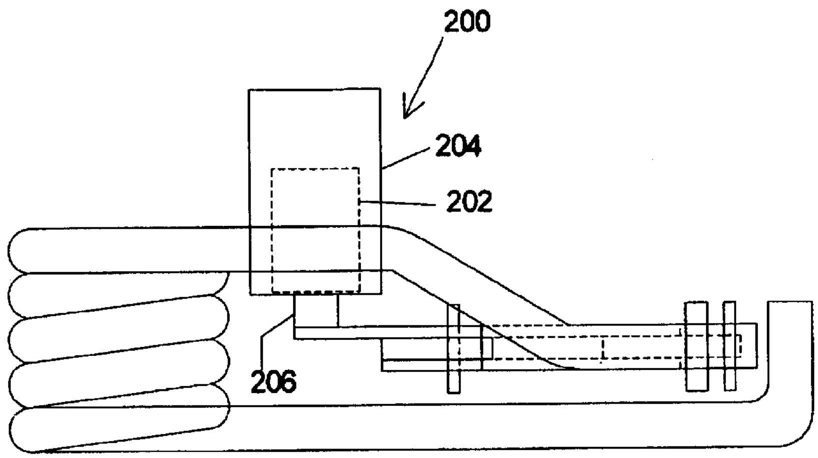
FIG. 11 shows an actuator using a voice coil.

Actuator 99 shown in FIGS. 3 and 4 is only one of various embodiments that can be used in the safety system described herein. Another embodiment is shown in FIG. 11, and is similar to the actuator shown in FIGS. 3 and 4 except that it uses a voice coil actuator 200 instead of a solenoid and plunger. Voice coil actuator 200 includes a wire coil 202 adjacent a magnet 204, similar to the construction of a speaker. When electric current from firing system 76 flows through coil 202, the coil is magnetized and either attracted to or repelled from magnet 204, which causes the coil to move. A pin 206 is attached to the coil and moves with the coil. That movement can be used to release a force, like in actuator 99 discussed above. Suitable voice coil actuators may be obtained from BEI Sensors & Systems Company, Kimco Magnetic Division, of San Marcos, Calif.

Another embodiment of an actuator uses a shape memory alloy, such as a Nitinol (nickel-titanium) actuator wire or CuAlNi or TiNiPd alloys, to provide a movement to release a force. Shape memory alloys contract when heated through a phase-change transition temperature, and can be restretched as they cool to ambient temperatures. For example, a Nitinol wire with a diameter of 0.010-inch and a maximum pull force of 930-grams may have a transition temperature of 70–90 degrees Celsius.

Figure 12:
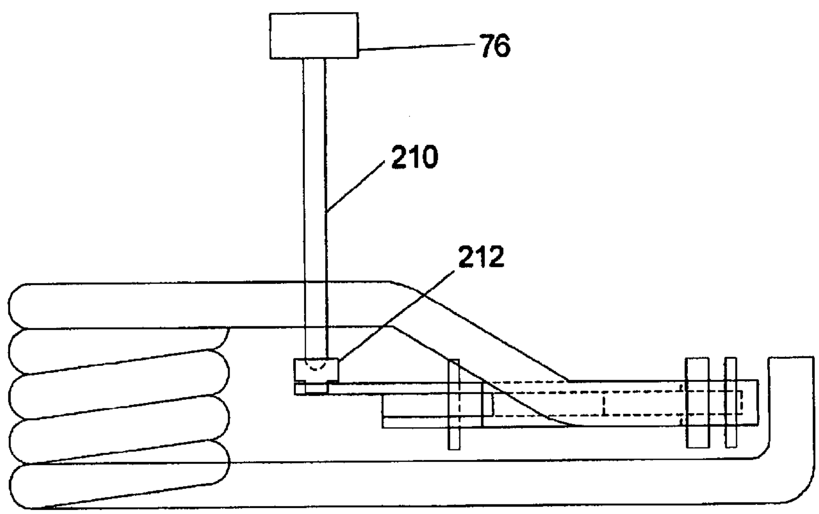
FIG. 12 shows an actuator using a shape memory alloy.
Figure 13:
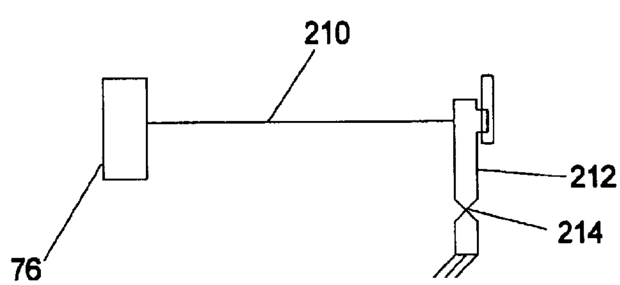
FIG. 13 shows a simplified side view of the actuator of FIG. 12.

One embodiment using a shape memory alloy is shown in FIG. 12, and it includes an actuator wire 210 connected to firing circuit 76 (which constitutes a source of electricity to heat the shape memory alloy) and to a pin 212. Pin 212 engages a first pivot arm and restrains that pivot arm from moving, just as plunger 104 restrains pivot arm 108 in the embodiment disclosed above in connection with FIGS. 3 and 4. Pin 212 is mounted in the housing of the actuator so that it can pivot away from the pivot arm to release the arm, and also so that it can prevent the pivot arm from moving while the pin is engaged with the pivot arm, as shown in FIG. 13. A hinge joint 214 allows pin 212 to pivot. The hinge joint can be constructed to bias pin 212 toward the first pivot arm to help insure that the pin remains engaged with the pivot arm until pulled by wire 210. When electric current from firing circuit 76 flows through wire 210, the resistance of the wire heats the wire and causes the wire to contract, which pulls pin 212 free from the first pivot arm, releasing the spring force as described above.

By way of example, shape memory actuator wires made of nickel-titanium and marketed by Dynalloy, Inc. under the trade name Flexinol may be used. A Flexinol wire having a diameter of approximately 0.01-inch and a resistance of 0.5-ohms per inch could provide approximately 930 grams of pull force, with an approximate current of 1000-milliamps and with a contraction of 4% of length over 1 second, where the contraction time is related to current input. A linear actuator marketed by NanoMuscle, Inc. of Antioch, Calif. under the trade name "NanoMuscle" is another example of a shape memory actuator that may be used.

In the safety systems described above, it is desirable that the shape memory alloy contract quickly in order to release a reaction system quickly. In those safety systems, the shape memory alloy typically needs to contract within 5 milliseconds of detecting a dangerous condition, and preferably within 1 millisecond. A large current pulse may be applied to the shape memory alloy to cause the alloy to contract in that timeframe. The amount of current to be applied will depend on several factors, including but not limited to the resistance of the wire, the length and volume of the wire, the heat capacity of the wire, etc.

By way of example, consider a 50-millimeter long Nitinol wire, cylindrically shaped with a diameter of 0.25 millimeters. Assume the heat capacity "$C_p$" of Nitinol is 0.077-calories per gram per degree Celsius, and the density "d" of Nitinol is 6.45-grams per cubic centimeter. The volume "V" of the wire is equal to the following:

$$V=\pi r^2 l=(3.14)(0.000125\ \text{m})^2(0.05\text{m})=2.45\times10^{-9}\ \text{m}^3=2.45\times10^{-3}\ \text{cm}^3$$

The mass "m" of the wire is as follows:

$$m=Vd=(2.45\times10^{-3}\ \text{cm}^3)(6.45\ \text{gm/cm}^3)=0.0158\ \text{gm}$$

Assuming the wire is at an ambient room temperature of approximately 20-degrees Celsius, and further assuming that the phase-change temperature of the wire is 70- to 90-degree Celsius, then the wire should be heated to a temperature of approximately 100-degree Celsius to ensure that the wire is heated through its phase-change transition temperature. Thus, the wire must be heated approximately 80-degrees Celsius, which is represented by "T." The energy "E" required to heat the wire that amount is given by:

$$E=m\ C_p\ T=(0.0158\ \text{gm})(0.077\ \text{cal/gm-C.}\ ^\circ)(80\ \text{C.}\ ^\circ)=0.1\ \text{cal}\approx0.5\ \text{Joules.}$$

This energy must be supplied quickly, for example within 1- to 5-milliseconds, so that the wire reacts with the desired speed. A charge storage device, such as a capacitor, and a gate device, such as a silicon controlled rectifier or SCR, may be used to provide this energy. The capacitor would store the energy and the SCR would gate that energy to ground through the wire. Many different capacitors may be used. For example, the energy "U" stored by capacitors is given the formula $U=\frac{1}{2}CV^2$, where "C" is the capacitance and "V" is the voltage of the capacitor. Selecting a voltage of 100-volts, and requiring 0.5-Joules of energy, results in the following capacitance:

$$C=2U/V^2=(2)(0.5\text{-Joules})/(100\text{-volts})^2=100\text{-microfarads.}$$

Thus, a 100-microfarad, 100-volt capacitor would store 0.5-Joules of energy. Capacitors discharge approximately 67% of their stored energy in the time given by the equation t=RC, where "t" is the time, C is the capacitance, and R is the resistance. Following that equation, the 100-microfarad capacitor discussed above would discharge 67% of its energy in 100 microseconds, assuming a resistance of 1-ohm. Essentially all of the energy stored in the capacitor would be released within 5-milliseconds. Of course, as is evident from the above discussion, various capacitors may be selected to supply the necessary energy in the desired time.

Advantages of using a shape memory alloy include the relatively small size of an actuator, ease of use, low power consumption, and the relative low cost of the material. The retraction force and stroke can also be readily determined and selected. This embodiment has particular application to inexpensive hand-held circular saws, and other less expensive saws, because of the low cost and small size of shape memory alloys.

Some embodiments also may use integrated force arrays instead of solenoids or voice coil actuators to create the motion to release the force. Integrated force arrays are flexible metalized membranes that undergo deformation when voltage is applied to them. An integrated force array resembles a thin, flexible membrane, and it contracts by around 30% in one dimension when voltage is applied to it. An integrated force array may be configured to provide substantial force.

An advantage of actuators using solenoids, voice coil actuators, shape memory alloys, or integrated force arrays, is that they may be configured for multiple uses. After a movement is produced to release a force, the actuator may be "re-cocked" by compressing the spring or recreating the force, repositioning the mechanical linkage holding the force, and then reinserting a pin to restrain the linkage. Additionally, the advantages described above relating to solenoids, such a releasing a force with a short, discrete stroke, are also applicable to voice coil actuators, shape memory alloys, and integrated force arrays.

The solenoids, voice coil actuators, shape memory alloys and integrated force arrays discussed above can be connected to firing system 76 to produce the necessary electric current. As will be appreciated by those of skill in the art, there are many circuits suitable for supplying this current. A typical circuit would include one or more charge storage devices that are discharged in response to an output signal from the control subsystem. (The output signal from the control subsystem is dependant on detection of a dangerous condition between a person and a blade, such as contact, as explained above.) It will be appreciated, however, that a current supply may be used instead of charge storage devices. Alternatively, other devices may be used to supply the necessary current, including a silicon-controlled rectifier (SCR) or triac connected to a power supply line. Transistors and/or SCRs may be used to release the charge in the charge storage devices upon a signal from the control subsystem.

Figure 14:
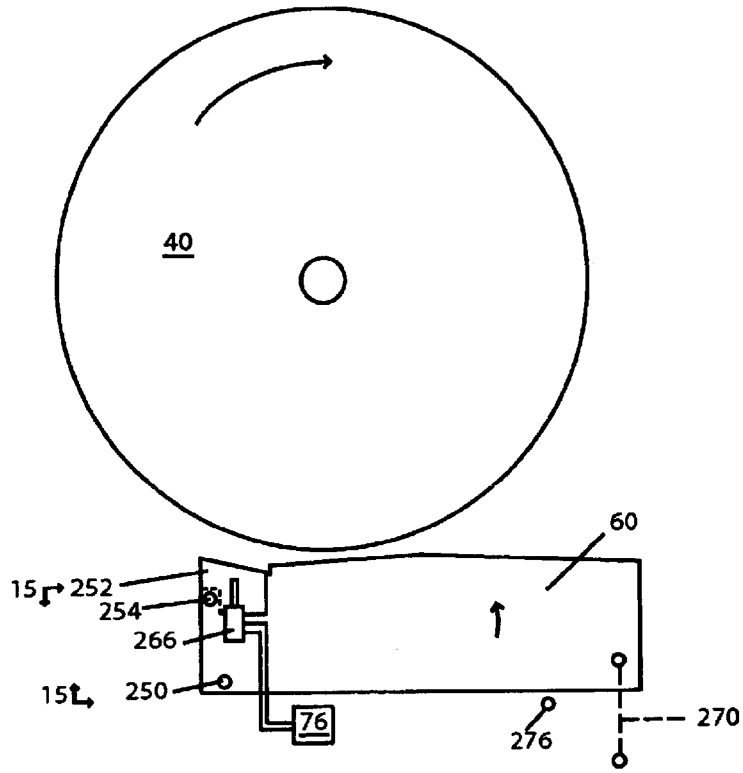
FIG. 14 shows another embodiment of an actuator using a solenoid and an engagement member or pilot pawl.
Figure 15:
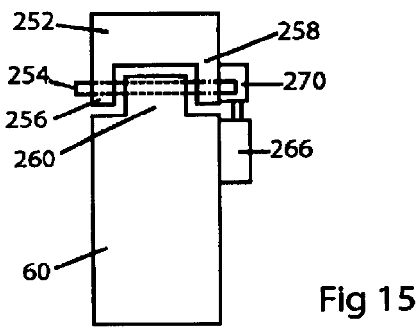
FIG. 15 shows an end view of the brake pawl from FIG. 14.
Figure 16:
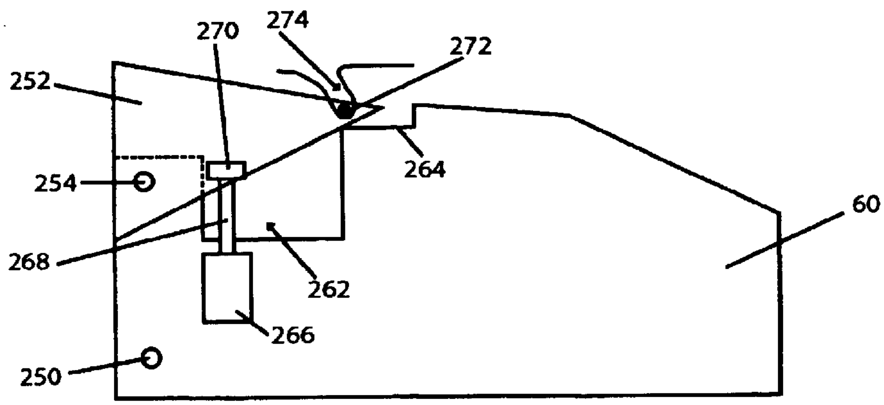
FIG. 16 shows an enlarged side view of the brake pawl of FIG. 14.

Another embodiment of an actuation system is shown in FIGS. 14 through 16. That embodiment includes an engagement member that moves into a spinning blade. The engagement member is attached to a brake pawl so that when the engagement member contacts the blade, the blade and engagement member pull the brake pawl into the blade to stop the blade. The engagement member is small and light so that it can be easily and quickly moved into the blade. This embodiment uses the force of the blade to move a brake pawl into the blade, instead of using a spring or some other item to move the brake pawl. The engagement member may be thought of as a pilot pawl that leads the brake pawl into the blade. The brake may be thought of as direct-acting because the force of the blade directly causes the brake to engage the blade.

FIG. 14 shows a blade 40 mounted for rotation in a clockwise direction. Blade 40 is shown without teeth for simplicity, but would have teeth around its periphery. A brake pawl 60 is positioned adjacent the blade, and mounted to pivot around a pivot pin 250 toward the blade. Pivot pin 250 holds the brake pawl in the saw. Brake pawl 60 is configured to pivot toward and engage blade 40 to stop the blade, as described.

An engagement member 252 is mounted to brake pawl 60 by a pivot pin 254. Engagement member 252 is positioned adjacent blade 40 so that it can pivot around pin 254 into the teeth of the blade. FIG. 15 shows a simplified end-view of brake pawl 60 and engagement member 252 with pivot pin 254, and FIG. 16 shows an enlarged view of the brake pawl and engagement member. Engagement member 252 includes two arms 256 and 258 that sandwich a post 260 on brake pawl 60. Pivot pin 254 passes through an aperture in the two arms and post to mount the engagement member to the brake pawl. Brake pawl includes a recessed area 262 shaped to accommodate engagement member 252. Brake pawl 60 also includes a shoulder 264 against which engagement member 252 abuts to prevent the engagement member from pivoting in a direction away from blade 40. Of course, the brake pawl and engagement member may be configured and connected in many different ways, and the illustrated embodiment is intended as only one example.

A small solenoid 266 is mounted on brake pawl 60, and a plunger 268 extends from the solenoid. Solenoid 266 is configured to cause plunger 268 to extend out when electricity is applied to the solenoid. The solenoid may be any one of various types of solenoids, but typically would be a small, light-weight solenoid, such as those found in some simple ground-fault-interrupt switches and circuit breakers. Solenoid 268 may be powered by firing system 76, as described above. In FIGS. 14–16, solenoid 266 is shown mounted to a surface of the brake pawl. The solenoid could be mounted adjacent the brake pawl in many ways, such as by screws, or the brake pawl could include a recess adapted to receive and hold the solenoid. Plunger 268 extends from solenoid 266 and contacts engagement member 252. In the depicted embodiment, plunger 268 abuts a flange 270 on the engagement member.

When firing system 76 powers solenoid 266, the solenoid causes plunger 268 to extend. The plunger, in turn, then pushes against flange 270 on engagement member 252, causing the engagement member to pivot around pin 254 into the blade. The teeth of the blade then strike the engagement member and cause the engagement member to move in the direction the blade is spinning. That movement then causes brake pawl 60 to pivot around pin 250 into the teeth of the blade. The blade cuts into the brake pawl and stops, as described above.

As stated, the engagement member is small and light so that little force is required to move it into engagement with the blade. The engagement member may be made of ABS plastic, for example, and have a mass small enough that an inexpensive solenoid would provide sufficient force to move the engagement member into contact with the blade quickly.

As shown in FIG. 14, a small wire or spring 270 (shown in dashed lines) may be used to hold the brake pawl away from the blade during normal use of the saw. The wire or spring would be configured to break or stretch, respectively, when the engagement member contacts the blade and the blade draws the brake pawl in. Alternatively, engagement member 252 may include a pin 272, shown in FIG. 16, that slides in a channel 274. Channel 274 is separate from and stationary relative to the brake pawl, and may be part of a housing or frame adjacent the brake pawl. The geometry of channel 274 is shaped so that pin 272 slides freely in the channel when the engagement member pivots around pin 254, but pin 272 cannot slide in the channel when brake pawl 60 tries to pivot around pin 250. In this manner, the brake pawl is prevented from pivoting toward the blade until the engagement member pivots out and pin 272 clears channel 274. FIG. 14 also shows that a stop 276 that may be positioned adjacent the brake pawl to prevent the brake pawl from pivoting away from the blade.

Figure 17:
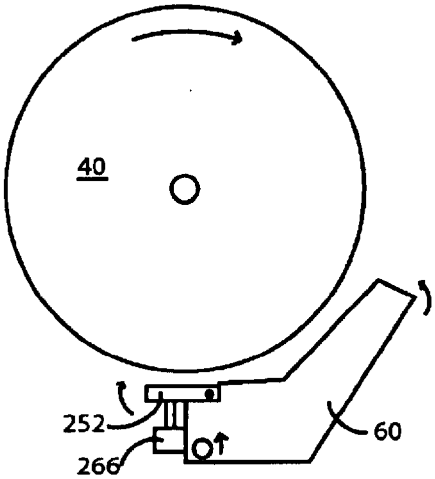
FIG. 17 shows another embodiment of an actuator with a loop or U-shaped member.

Systems that use a solenoid to move an engagement member or pilot pawl may take many different forms. FIG. 17 shows a blade 40 with a brake pawl 60 adjacent the blade. A solenoid 266 is mounted on the brake pawl, and configured to push an engagement member 252 down into the teeth of the blade. The teeth of the blade then catch on the engagement member and pull the brake pawl into the blade. The engagement member may take many forms, such as a "U" shaped member configured to loop over the teeth of the blade, wire, Kevlar or fabric mesh configured to snag the teeth of the blade, or simply material into which the teeth of the blade can cut.

Figure 18:
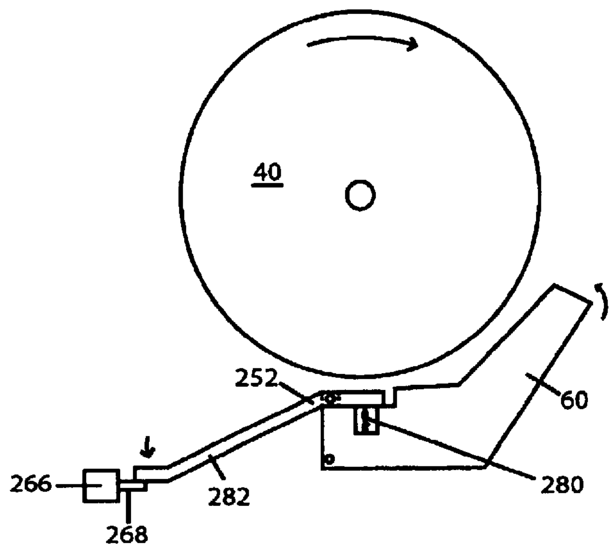
FIG. 18 shows an embodiment of an actuator with a solenoid holding a lever arm.
Figure 19:
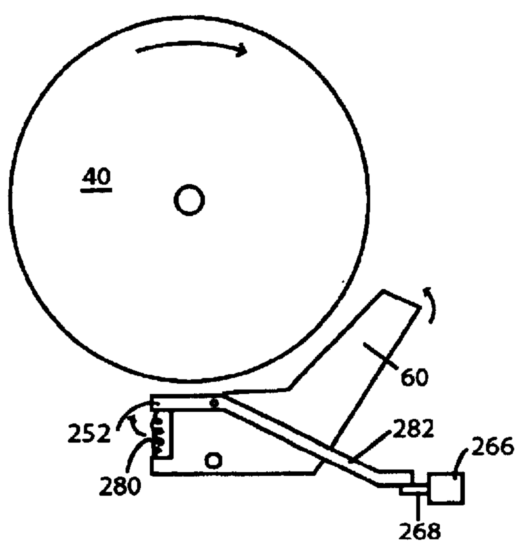
FIG. 19 shows an embodiment similar to the embodiment shown in FIG. 18, except with the lever arm positioned differently.

FIG. 18 shows a blade 40 and brake pawl 60, with an engagement member 252 biased to pivot around a pin toward the blade by a spring 280. A solenoid 266 holds the engagement member away from the blade. The solenoid includes a plunger 268 configured to retract into the solenoid when the solenoid is powered, thereby releasing the engagement member to engage the blade. In that embodiment, engagement member 252 includes a long lever arm 282 so that plunger 268 and solenoid 266 can hold spring 280 with little force. Alternatively, a linkage to provide additional mechanical advantage, such as the linkage described above in connection with FIGS. 3–10, could be used to further minimize the force on the plunger from the spring. A similar embodiment is shown in FIG. 19, with engagement member 252 and spring 280 positioned differently.

Figure 20:
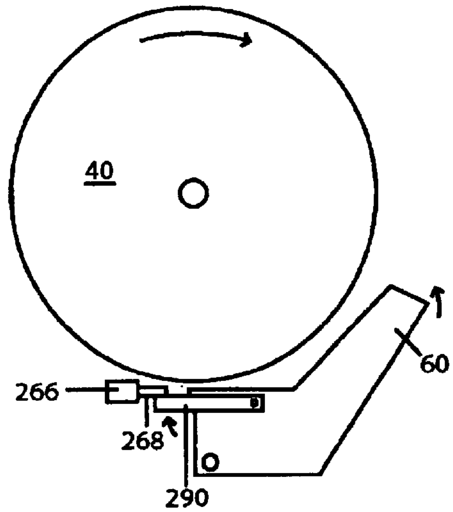
FIG. 20 shows an embodiment of an actuator with a loop or leaf spring.

FIG. 20 shows an embodiment that includes a loop or leaf spring 290 mounted to a brake pawl 60. The loop spring is biased to move toward blade 40, but is held back by a solenoid 266 and plunger 268. When the plunger retracts, the loop moves toward the blade under its own spring force and catches on the teeth of the blade to pull the brake pawl into the blade.

Figure 21:
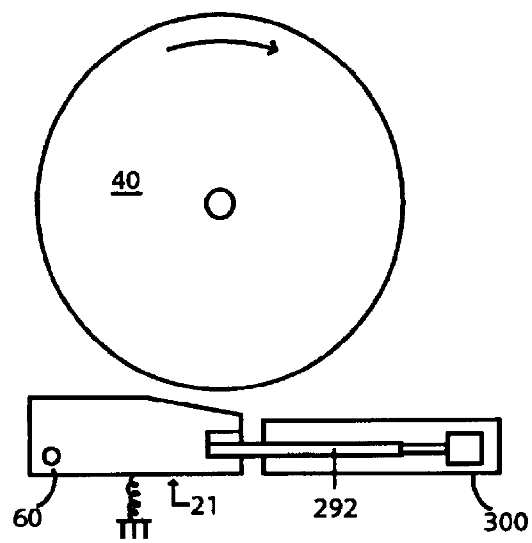
FIG. 21 shows an embodiment where a solenoid retracts to release two lever arms.
Figure 22:
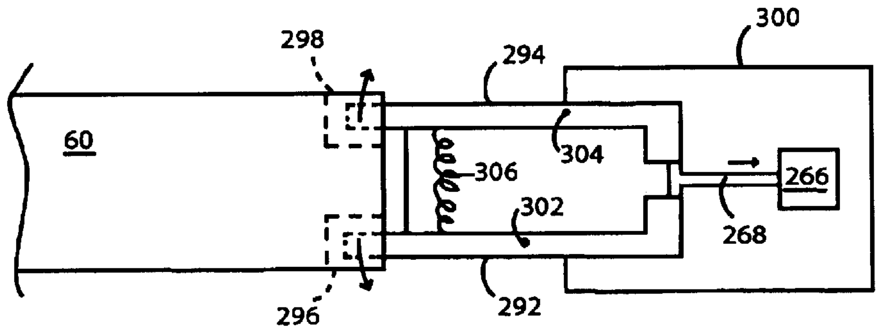
FIG. 22 shows a simplified view of part of the embodiment shown in FIG. 21.

A side view of another embodiment that uses a solenoid to release a brake pawl is shown in FIG. 21, and a simplified bottom view of the pawl and release is shown in FIG. 22. This embodiment includes a brake pawl 60 that is spring-biased to move into blade 40 to stop the blade. However, the brake pawl is restrained from movement by two levers 292 and 294. Those levers engage two pockets 296 and 298, respectively, on the brake pawl to prevent the brake pawl from moving. Levers 292 and 294 are mounted in a housing 300 on pivot pins 302 and 304, respectively. A spring 306, mounted in the housing, tends to push the levers apart, as indicated by arrows. A solenoid 266 and plunger 268 are positioned adjacent the ends of the levers opposite the brake pawl, and the plunger extends between the levers to prevent them from pivoting. The solenoid is configured to retract the plunger, and when it does, the levers are free, so spring 306 then causes the levers to pivot, thereby releasing the brake pawl to move into the blade. Housing 300 is configured with slots to allow the levers to pivot outwardly to release the brake pawl. Bearings may be placed on the ends of the levers to allow the solenoid to more easily retract the plunger. This embodiment could be modified so that only one lever is used to prevent the brake pawl from moving. The levers may be vertically offset from each other to provide clearance.

Figure 23:
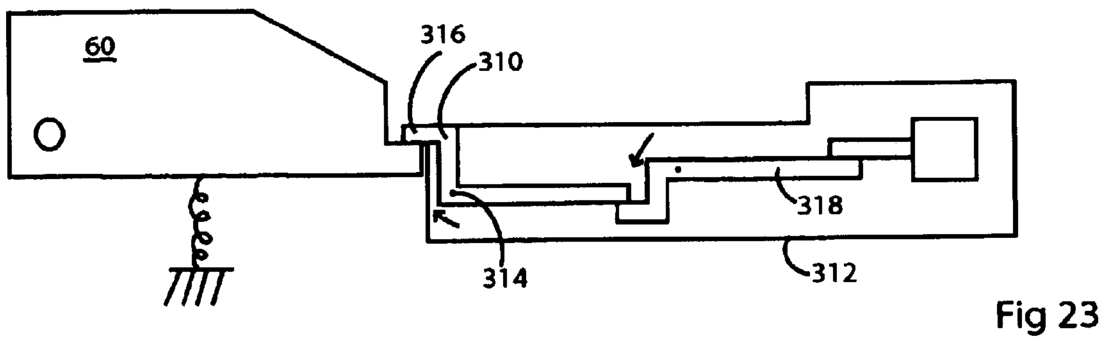
FIG. 23 shows another embodiment of an actuator with two levers.

Another embodiment is shown in FIG. 23. It includes a brake pawl 60 with a spring to push the brake pawl into a blade. The brake pawl is restrained from movement by a first lever 310 mounted in a housing 312 to pivot around a pin 314. First lever 310 includes an end 316 that fits through a slot in the housing and that engages the brake pawl, as shown. A second lever 318 mounted in the housing restrains the first lever, and a solenoid and plunger, also mounted in the housing, restrain the second lever. When the solenoid is actuated, the plunger retracts into the solenoid, allowing the levers to pivot and the brake pawl to engage the blade. The levers may be shaped in many different forms, and are shown in FIG. 23 as step-shaped to provide a compact assembly.

Figure 24:
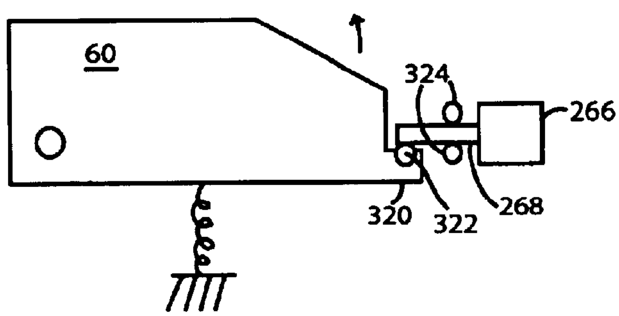
FIG. 24 shows an embodiment of an actuator where a solenoid directly releases a brake pawl.

Another simple embodiment is shown in FIG. 24. It includes a solenoid 266 with a plunger 268. The plunger is positioned to engage a shoulder 320 of a brake pawl 60 to prevent the brake pawl from moving into a blade. As explained above, a strong spring could be used to push the brake pawl toward the blade quickly. However, a strong spring would create substantial friction on the plunger. Accordingly, a first roller bearing 322 is placed on the shoulder of the brake pawl to allow the plunger to slide off the shoulder when the solenoid retracts the plunger, and a second bearing 324 is positioned to support the plunger.

It will be appreciated by those of skill in the applicable arts that any suitable embodiment or configuration of the actuators discussed generally above could be used. The control systems, power supplies, sense lines and other items related to or used with actuators are discussed in more detail in U.S. Provisional Patent Application Ser. No. 60/225,200, titled "Contact Detection System for Power Equipment," U.S. Provisional Patent Application Ser. No. 60/225,211, titled "Apparatus and Method for Detecting Dangerous Conditions in Power Equipment," and U.S. Provisional Patent Application Ser. No. 60/225,059, titled "Logic Control for Fast-Acting Safety System," all filed Aug. 14, 2000, the disclosures of which are herein incorporated by reference.

INDUSTRIAL APPLICABILITY

The safety systems and actuators described herein are applicable to power equipment, and specifically to power equipment wherein some action is triggered or released. The safety systems and actuators are particularly applicable to woodworking equipment such as table saws, miter saws, band saws, circular saws, jointers, etc. The safety systems and actuators described herein may be adapted for use on a variety of other saws and machines, and further descriptions may be found in the following references, the disclosures of which are herein incorporated by reference: PCT Patent Application Serial No. PCT/US00/26812, filed Sep. 29, 2000; U.S. patent application Ser. No. 09/676,190, filed Sep. 29, 2000; U.S. Provisional Patent Application Ser. No. 60/306,202, filed Jul. 18, 2001; U.S. Provisional Patent Application Ser. No. 60/302,916, filed Jul. 3, 2001; U.S. Provisional Patent Application Ser. No. 60/302,937, filed Jul. 2, 2001; U.S. Provisional Patent Application Ser. No. 60/298,207, filed Jun. 13, 2001; U.S. Provisional Patent Application Ser. No. 60/292,100, filed May 17, 2001; U.S. Provisional Patent Application Ser. No. 60/292,081, filed May 17, 2001; U.S. Provisional Patent Application Ser. No. 60/279,313, filed Mar. 27, 2001; U.S. Provisional Patent Application Ser. No. 60/275,595, filed Mar. 13, 2001; U.S. Provisional Patent Application Ser. No. 60/275,594, filed Mar. 13, 2001; U.S. Provisional Patent Application Ser. No. 60/275,583, filed Mar. 13, 2001; U.S. Provisional Patent Application Ser. No. 60/273,902, filed Mar. 6, 2001; U.S. Provisional Patent Application Ser. No. 60/273,178, filed Mar. 2, 2001; U.S. Provisional Patent Application Ser. No. 60/273,177, filed Mar. 2, 2001; U.S. Provisional Patent Application Ser. No. 60/270,942, filed Feb. 22, 2001; U.S. Provisional Patent Application Ser. No. 60/270,941, filed Feb. 22, 2001; U.S. Provisional Patent Application Ser. No. 60/270,011, filed Feb. 20, 2001; U.S. Provisional Patent Application Ser. No. 60/233,459, filed Sep. 18, 2000; U.S. Provisional Patent Application Ser. No. 60/225,212, filed Aug. 14, 2000; and U.S. Provisional Patent Application Ser. No. 60/225,201, filed Aug. 14, 2000.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions.

We claim:

1. An actuator for use in a safety system for a power tool, where the power tool includes a moving blade, the actuator comprising:

an engagement member adapted to move into contact with the moving blade, a brake pawl attached to the engagement member so that when the engagement member contacts the moving blade, the blade and engagement member pull the brake pawl into the blade, and a mechanism adapted to cause the engagement member to move into contact with the blade prior to the blade and engagement member pulling the brake pawl into the blade.

2.The actuator of claim 1, where the mechanism adapted to cause the engagement member to move into contact with the moving blade includes a splenoid.

3.The actuator of claim 1, where the mechanism adapted to cause the engagement member to move into contact with the moving blade includes a shape memory alloy.

4. The actuator of claim 1, where the mechanism adapted to cause the engagement member to move into contact with the moving blade includes a voice coil.

5. The actuator of claim 1, where the mechanism adapted to cause the engagement member to move into contact with the moving blade includes an integrated force array.

6. The actuator of claim 1, where the engagement member is pivotally attached to the brake pawl.

7. The actuator of claim 1, further comprising a restraint mechanism to hold the brake pawl away from the blade during normal use of the power tool.

8. The actuator of claim 1, where the engagement member comprises a U-shaped member.

9. The actuator of claim 1, where the engagement member comprises a wire.

10. The actuator of claim 1, where the engagement member comprises a mesh.

11. The actuator of claim 1, where the engagement member comprises a leaf spring.

12. The actuator of claim 1, where the engagement member and brake pawl are configured so that the force of the moving blade causes the brake pawl to engage the blade.

13. The actuator of claim 1, where the engagement member is configured to pivot into the blade.

14. The actuator of claim 13, further comprising a source of stored force adapted to bias the engagement member toward the blade.

15. The actuator of claim 14, where the mechanism adapted to cause the engagement member to move into contact with the blade includes a solenoid and plunger positioned to prevent the source of stored force from causing the engagement member to pivot into the blade until the plunger is moved by the solenoid.

16. An actuator for use in a safety system for a power tool, where the power tool includes a moving blade, the actuator comprising:

brake means for contacting and braking the moving blade, engagement means for moving into contact with the moving blade and for pulling the brake means into contact with the moving blade, means for causing the engagement means to move into contact with the moving blade prior to the engagement means pulling the brake means into contact with the moving blade.

* * * * *

UNITED STATES PATENT AND TRADEMARK OFFICE

CERTIFICATE OF CORRECTION

PATENT NO. : 6,945,149 B2
APPLICATION NO. : 10/205164
DATED : September 20, 2005
INVENTOR(S) : Stephen F. Gass and David A. Fanning It is certified that error appears in the above-identified patent and that said Letters Patent is hereby corrected as shown below:

Column 16, line 17, delete "splenoid" and insert --solenoid--.

Signed and Sealed this
Tenth Day of July, 2012

David J. Kappos
*Director of the United States Patent and Trademark Office*